United States Patent [19]

Oberloier

[11] 4,030,650

[45] June 21, 1977

[54] TAIL FLASH REMOVAL APPARATUS

[75] Inventor: John W. Oberloier, Beaverton, Mich.

[73] Assignee: Lyle Development, Inc., Beaverton, Mich.

[22] Filed: July 8, 1976

[21] Appl. No.: 698,732

[52] U.S. Cl. .............................. 225/100; 83/914; 225/103; 425/806

[51] Int. Cl.² ......................................... B26F 3/02

[58] Field of Search ............ 225/97, 100, 106, 101, 225/102, 103; 83/914; 425/806

[56] References Cited

UNITED STATES PATENTS

| 3,040,376 | 6/1962 | Elphee | 425/806 X |
|---|---|---|---|
| 3,783,724 | 1/1974 | Uhlig | 83/914 X |
| 3,895,751 | 7/1975 | Shepherd | 225/101 X |
| 3,901,637 | 8/1975 | Eggert | 425/806 X |

*Primary Examiner*—Frank T. Yost
*Attorney, Agent, or Firm*—Learman & McCulloch

[57] ABSTRACT

Apparatus for removing tail flash from molded plastic articles, such as containers or bottles, in which a pair of reciprocatory jaw assemblies are formed with meshing teeth which engage the flash from opposite sides and subsequently tear the flash from the article. The jaw assemblies are formed with meshing tooth-like projections which engage flash from opposite sides at spaced locations along the line of juncture between the web of flash and the surface of the article. Inclined cam surfaces on one jaw assembly urge a flash web engaged between the teeth of the closing jaws outwardly away from the article to tear the flash clear of the article.

6 Claims, 4 Drawing Figures

TAIL FLASH REMOVAL APPARATUS

SUMMARY OF THE INVENTION

The present invention is especially designed to remove flash webs, such as tail flash from molded plastic containers where the plastic material from which the container is molded is of a relatively hard or brittle material which is more susceptible to breaking or tearing. Most flash web removing devices employ a cutting or shearing action to cut the flash from the article body with a knife-like shearing action. Where harder materials are employed, the knife edge is exposed to greater wear with the attendant necessity of frequent knife replacement or sharpening.

In accordance with the present invention, instead of being cut, the flash web is gripped between two jaw assemblies having offset meshing teeth at opposite sides of the flash and a wedge-like cam surface on one set of teeth is employed to force or tear the flash from the article.

In accordance with the present invention, a pair of vertically reciprocal opposed jaw assemblies are provided. One of the jaw assemblies is formed with an article receiving seat which supports and locates the article relative to the jaw assemblies with the line of juncture between the web of flash to be removed and the article body lying in the same general vertical plane as do the edges of spaced teeth formed on each of the jaw assemblies. One jaw assembly is provided with an inclined cam surface which functions as a wedge to become first embedded in and next to physically force the flash web laterally away from the article to rip the web from the article.

The opposed jaw assemblies have teeth of generally square configuration with the teeth on the respective jaw assemblies offset from each other so that the teeth on one jaw assembly are aligned with the recesses between adjacent teeth on the other jaw assembly. When the jaw assemblies are moved toward each other to engage the flash at opposite sides along its line of juncture with the article, the flash is pressed by the closing jaws so that the inclined surfaces on one set of teeth begin to force the flash outwardly away from the article. The teeth on the opposite jaw assembly are mounted on a jaw portion which is hingedly mounted to the jaw frame for pivotal movement about an axis parallel to the edges of its teeth so that the teeth on this latter jaw assembly can swing outwardly away from the article as the flash is wedged away from the article by the inclined surfaces of the teeth on the first jaw.

Other objects and features of the invention will become apparent by reference to the following specification and to the drawings.

IN THE DRAWINGS

Figure 1:
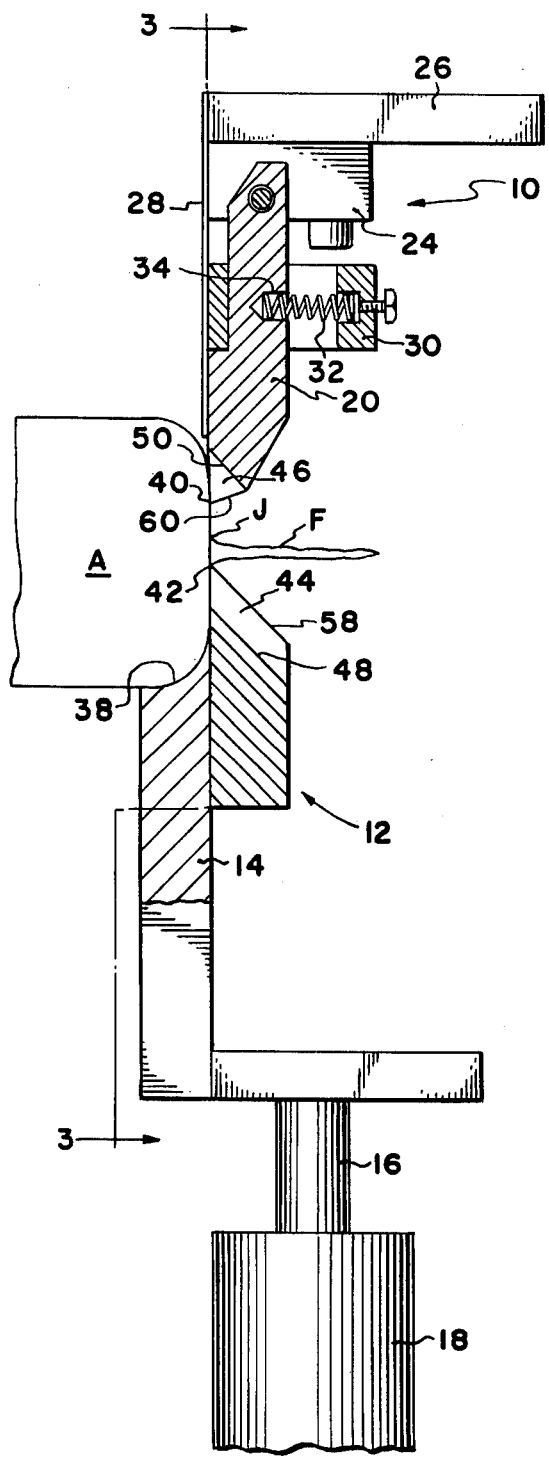
FIG. 1 is a detail cross-sectional view taken on a vertical plane showing apparatus embodying the present invention with the jaw assemblies in an open position.
Figure 2:
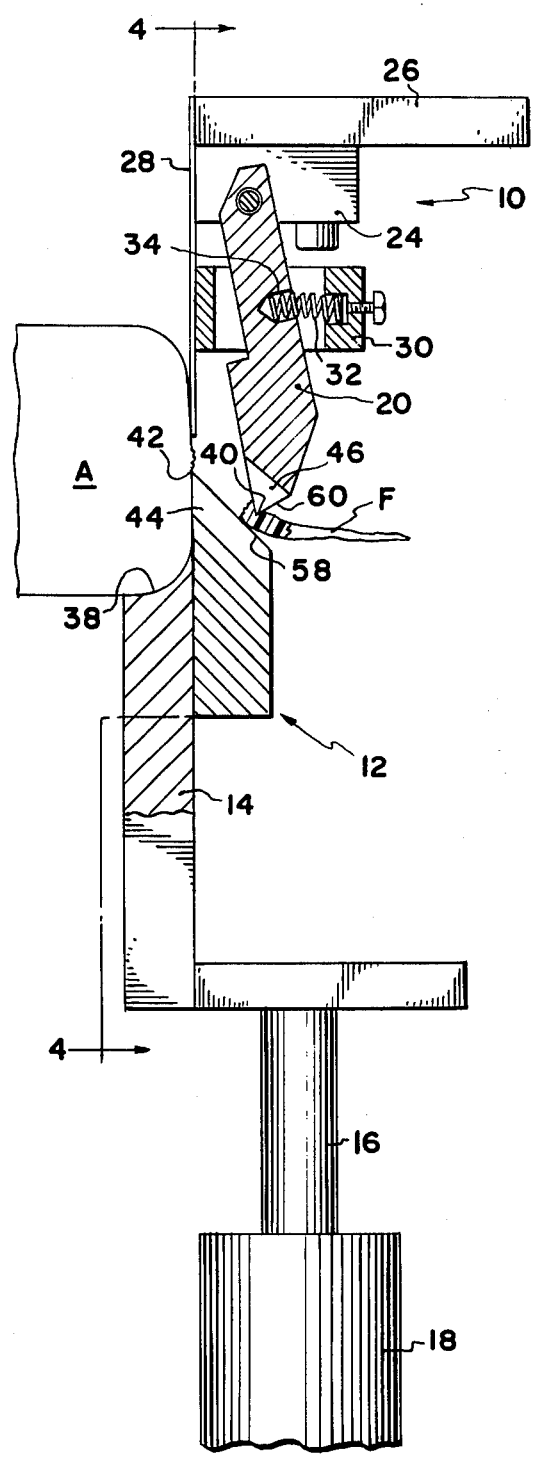
FIG. 2 is a view similar to FIG. 1, showing the jaw assemblies in an actuated position.

Referring first to FIGS. 1 and 2, apparatus embodying the present invention includes a stationary frame assembly designated generally 10 and a movable jaw assembly designated generally 12, jaw assembly 12 being mounted upon a bracket and article seating member designated generally 14 which is in turn fixedly mounted upon the vertically reciprocable piston rod 16 of a hydraulic cylinder 18.

Stationary jaw assembly 10 includes a jaw member 20 which is pivotally mounted between a pair of stationary blocks 24. Blocks 24 are in turn fixedly mounted upon a stationary frame member 26 which also carries a fixed article stop plate 28. A bracket 30 caries a compression spring 32 having one end seated in a bore 34 in jaw member 20 to resiliently bias jaw member 20 to the position shown in FIG. 1 in which jaw member 20 is held in face-to-face engagement with stop plate 28.

The lower or movable jaw assembly 12 is formed with an article seating saddle or recess 38 which is conformed to seat and support an article A upon jaw assembly 12, the article A having an integral web of flash F which is to be detached from the article by the apparatus shown in the drawings. As best seen in FIG. 1, the article seating surface 38 is so located that when the article is seated, the flash F projects between the opened jaw assemblies 10 and 12 with the line of juncture J between the flash F and article A being located between the edge surfaces 40 and 42 of jaws 20 and 12 respectively.

Figure 3:
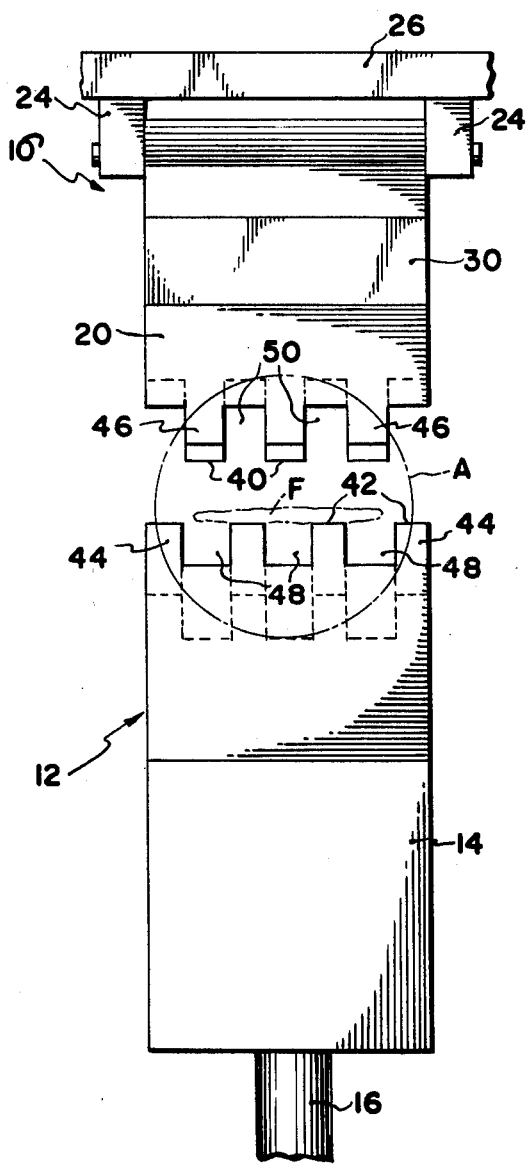
FIG. 3 is a front view of the apparatus as shown in FIG. 1.
Figure 4:
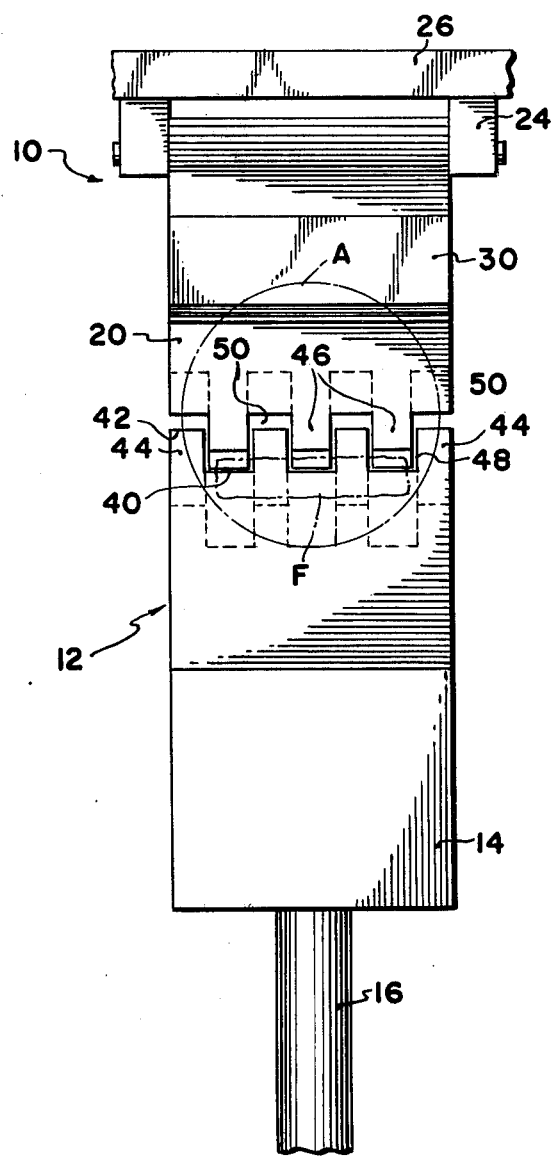
FIG. 4 is a front view of the apparatus in the position of FIG. 2.

Referring now particularly to FIG. 3, it is seen that the edges 40 and 42 of the jaw members are formed with spaced projecting teeth 44 on jaw member 12 and teeth 46 on jaw member 20. As best seen in FIG. 3, teeth 44 and 46 are respectively spaced from each other by recesses 48, 50 respectively with teeth 46 of upper jaw member 20 aligned with recesses 48 between the teeth 44 of lower jaw member 12, teeth 44 in turn being aligned with recesses 50 of upper jaw member 20. The width of recesses 48 and 50 respectively slightly exceed the width of the opposed teeth 46 and 44 so that, as the jaws close on a flash web F located between the jaws, none of the edges 52 of teeth 44 are in direct vertical opposition with any of the edges 54 of teeth 46. Edges 40 and 42 are straight and aligned with each other and are sharpened to a degree sufficient to enable them to be embedded in the material of the flash web F, although it is to be emphasized that their function is not to cut or sever the flash by a shearing action.

As best seen in FIG. 2, the upper surface of teeth 44 are smoothly inclined downwardly and outwardly from edge 42 to provide an inclined cam surface 58 which, during operation of the apparatus assists in tearing the web of flash F from the article.

In operation, hydraulic motor 18 is actuated, in a manner well known in the art, to retract its piston rod to the position shown in FIG. 1, at which time the lower or movable jaw 12 is spaced from jaw member 20 in an open position. An article A having an integral web of flash F to be removed is located in the apparatus by seating the article in seat 38. The configuration of seat 38 is so related to the shape of the article, that when the article is seated the line of juncture J between the web of flash F and the main body of article A extends along and rests upon the spaced edges 42 of the teeth of jaw member 12. At this time, spring 32 has resiliently biased the upper jaw 20 to the position shown in FIG. 1 in which the edge 40 of the teeth of the upper jaw member lies against the article surface in the same vertical general plane as the edge 42 of the teeth of the lower jaw 12.

Motor 18 is the actuated to drive lower jaw 12 upwardly, carrying with it article A. As the article is elevated, the flash web F moves into engagement with edges 40 of the teeth of upper jaw 20, and further upward movement of lower jaw 12 and the seated article causes the edges 40 and 42 of the upper and lower jaw members to become embedded in the web along the line of juncture J between the web and article. The lower surface of the teeth 46 of upper jaw 20 is inclined slightly upwardly from edge 40 as at 60 so that the upper jaw exerts both a downward and somewhat outward pressure against the flash web which is being pushed up against it by the upwardly moving lower jaw 12. Cam surface 58 of lower jaw 12 is inclined downwardly and outwardly rather steeply, and thus as the flash is compressed between the two sets of teeth, the inclined cam surface 58 of jaw member 12 exerts a fairly substantial outwardly directed force against the flash web tending to pull or tear the web clear of the article A along its line of juncture.

As the approaching jaw members move into overlapped relationship with each other, the forces exerted increase to the point where the web is torn from the article, this action being assisted by the outwardly pivoting action of upper jaw member 20 as shown in FIG. 2. It should be pointed out that the pivoting action of upper jaw member 20 as shown in FIG. 2 is not the result of any direct engagement between the upper and lower jaw members, but instead occurs because of the bridging action of the flash web between adjacent inclined surfaces 58 on the lower jaw, the teeth of upper jaw 20 being engaged with that portion of the flash which bridges the gap or recess 48 between adjacent teeth of the lower jaw. The outwardly pivoting action of upper jaw 20 provides an ejecting action tending to move the flash web downwardly and clear of lower jaw 12 so that the detached flash web can drop by gravity into a suitable collector.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Apparatus for removing an integral web of flash from a molded plastic article such as a container or the like, said apparatus comprising opposed first and second jaw assemblies mounted for reciprocatory movement toward and away from each other between a spaced apart open position and an overlapped actuated position, article seating means on one of said jaw assemblies operable when said assemblies are in their open position to locate an article having an integral web of flash on said one of said jaw assemblies with said web projecting between said jaw assemblies, spaced apart flash engaging teeth on each of said jaw assemblies, the teeth on one jaw assembly being aligned with the spaces between the teeth on the other of said jaw assemblies, inclined cam surfaces on the teeth of said first jaw assembly for forcing flash engaged between the teeth of said assemblies outwardly away from said article as said jaw assemblies move toward said actuated position, and hinge means on said second jaw assembly accommodating outward movement of the teeth of said second jaw assemblies with said flash.

2. Apparatus as claimed in claim 1 wherein said teeth have straight aligned flash engaging edges spaced from each other by recesses having parallel side walls normal to said edges, the recesses on one jaw assembly having a width between adjacent edges equal to or greater than the width of an opposed tooth on the other jaw assembly whereby in the absence of a web of flash between said edges movement of said jaw assemblies toward their actuated position would cause the teeth on one jaw assembly to enter the recesses of the other jaw assembly.

3. Apparatus as defined in claim 2 wherein said seating means is disposed on one side of said first jaw assembly and located relative to the flash engaging edges of said first jaw assembly to position the line of juncture of the web of flash with the article in alignment with said edges when said article is seated in said seating means.

4. Apparatus as defined in claim 3 wherein said jaw assemblies are mounted for reciprocatory movement relative to each other in a vertical general plane with said first jaw assembly being located below said second jaw assembly, said inclined cam surfaces on said teeth of said first jaw assembly being inclined downwardly from the edges of said teeth and outwardly away from said one side of said first jaw assembly.

5. Apparatus as defined in claim 4 wherein said second jaw assembly comprises a frame, a jaw portion carrying the teeth of said second jaw assembly pivotally mounted on said frame by said hinge means for pivotal movement about a horizontal axis parallel to the edges of said teeth of said second jaw assembly, and spring means biasing said jaw portion to a rest position wherein the edges of the teeth of both jaw assemblies lie in a common vertical general plane.

6. Apparatus as defined in claim 5 wherein said frame of said second jaw assembly is mounted in a fixed position, and drive means coupled to said first jaw assembly for driving said second jaw assembly in vertical reciprocatory movement between said open and said actuated positions.

* * * * *

UNITED STATES PATENT OFFICE
CERTIFICATE OF CORRECTION

Patent No. 4,030,650                  Dated June 21, 1977

Inventor(s) John W. Oberloier

It is certified that error appears in the above-identified patent and that said Letters Patent are hereby corrected as shown below:

Column 2, line 12, "caries" should read --carries--.
Column 3, line 1, "edge" should read --edges--.
Column 3, line 3, "the" should read --then--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks